Sept. 4, 1951         J. A. MORTON         2,566,848
WIRE WINDING AND TENSIONING DEVICE
Filed Sept. 23, 1947
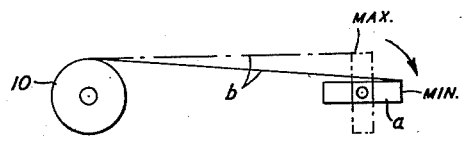
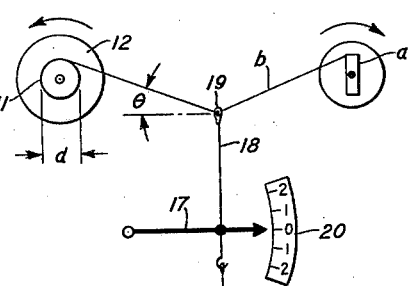
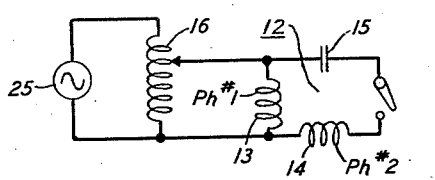
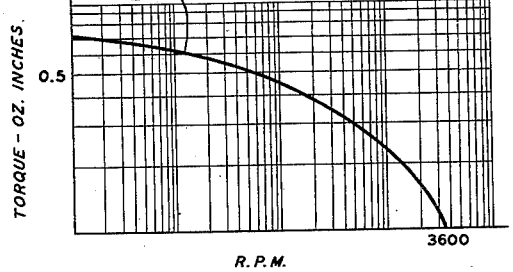
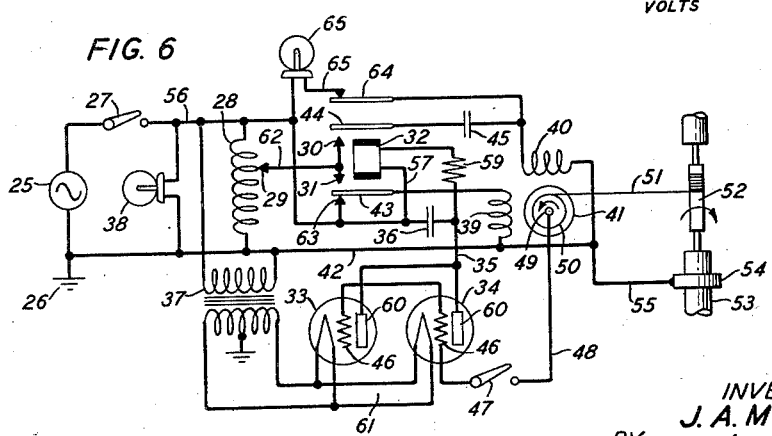
INVENTOR
J. A. MORTON
BY
ATTORNEY Patented Sept. 4, 1951

2,566,848

UNITED STATES PATENT OFFICE 2,566,848

WIRE WINDING AND TENSIONING DEVICE

Jack A. Morton, Neshanic Station, N. J., assignor to Bell Telephone Laboratories, Incorporated, New York, N. Y., a corporation of New York Application September 23, 1947, Serial No. 775,733

13 Claims. (Cl. 242—45)

This invention relates to wire winding mechanisms with tension control and methods of operating same and more particularly to helical winding of fine wire in the formation of grids or other types of helical electrodes for electronic discharge devices.

A principal object of the invention is to attain a known constant tension through a wide range of speed in the winding of fine wire electrodes.

Another object of the invention is to equalize the retarding and pulling forces, independent of winding velocity, operating in contradirections on the fragile wire to insure tensional stresses of sufficient magnitude to obtain uniform stretched windings on a foundation support.

Another object of the invention is to control the retarding force in such a manner that the fine wire is not distorted and the end not lost if a break occurs during the winding procedure.

A further object of the invention is to govern the retarding force by including the wire being wound as an element of the control circuit.

Another object of the invention is to interrupt the retarding force instantaneously when the wire is severed by switching means under the influence of a grid controlled rectifier in which the wire is in the grid biasing circuit.

Another object of the invention is to control a voltage and hence the retarding force so that a counter-pulling stress is imposed on the wire during the winding to apply the required tension to the wire.

A further object of the invention is to insure positive action in the switching mechanism when a break occurs in the wire by energy which is controlled by the wire in the circuit.

These objects are attained in accordance with this invention by mounting a light wire reel on a shaft of a fractional unipolar induction motor adapted for counter-revolution operation with respect to the grid winding mechanism and controlling the torque in the motor to apply the desired tension to the wire during the winding operation. The drag imposed on the wire while being wound produces the required tension in the wire irrespective of the variations in the pulling force acting on the wire during the winding operation. The tension or retarding force, which is independent of the velocity, acting on the wire produces the desired stress, precisely below the rupture strength of the wire, to attain uniformity in the grid laterals and spacings thereof to such an extent that loss of tension after brazing and heat treatment of the completely wound grid electrode is overcome.

A feature of the invention relates to the control of the retarding force on the wire if the wire is ruptured during winding to prevent distortion and loss of the end of the fine wire. This is accomplished by incorporating the wire as a biasing element of a grid controlled rectifier device which actuates a switching element to start and stop the retarding force applied to the wire.

Another feature of the invention relates to the coupling of the wire supply spool as a component of the retarding device and the provision of a conductive connection to the wire through the shaft of the retarding or braking device. This arrangement permits the connection of the wire in the control circuit of the winding mechanism and provides a means of direct conductive coupling to the shaft of the braking force component of the system.

A further feature of the invention pertains to control of the torque of the retarding force in relation to the pulling force on the wire so that a predetermined stress is imposed on the wire whereby the desired tension is secured. This is accomplished by controlling the voltage supplied to a unipolar induction motor having a high torque to rotor inertia ratio so that the torque of the motor may be correlated to the winding mechanism wherein the torque is relatively independent of the winding speed if less than the retarding device, to apply the desired stress on the wire being wound.

Another feature of the invention relates to the trigger operation of the grid-controlled rectifier for applying braking potential to the retarding force producing element to prevent injury or distortion and loss of the end to the fine wire on the supply reel. This is accomplished by biasing the grid of the rectifier to a value sufficient for initiating current flow to a switching device which controls the voltage supplied to the retarding force device. When the wire breaks, the grid of the rectifier partially blocks current flow between the plate and filament circuit and the switching relay is deenergized. When the relay is deenergized, braking power is applied to the retarding device, by opening one phase winding to stop the motor and hold the wire reel stationary so that overrunning of the reel is prevented. In addition, a visual signal is provided by the operation of the switching device to indicate that the wire is broken.

These and other features and advantages of the invention will be more clearly understood from the following detailed description when considered with the accompanying drawing:

Fig. 1 is a diagrammatic view of the winding of a flat type grid with fine wire laterals and showing the tension forces exerted on the wire during a winding operation;

Fig. 2 is another diagrammatic view illustrating an arrangement to determine tension in the wire during the winding operation with the aid of a drag or retarding device;

Fig. 3 shows a schematic circuit of the retarding device and the regulating means for controlling the voltage supplied to the device;

Fig. 4 illustrates the speed-torque characteristic curve of the retarding device;

Fig. 5 shows calibrated curves of the tension imposed on the wire by the controlled retarding device for different sizes of supply reels; and Fig. 6 is a diagrammatic view of the complete circuit for regulating and controlling the tension on the wire during the winding operation and preventing distortion and end loss of the fine wire if the wire is accidentally severed.

In wire winding operations wherein uniform tension in the wire is desired to be held to a predetermined value depending on the pulling force required in winding the wire, the usual mechanical forces exerted on the wire cannot be uniformly regulated due to the variable forces acting on the wire in winding in coil formation, for example on a take-up reel. This problem is particularly present in winding very fine diameter wire of the order of .0005 inch or less in diameter which is now finding considerable use in the winding of minute grid structures for ultra-high frequency electronic devices. Such fine wire is extremely delicate and is easily broken if greater than a few grams weight force over a certain optimum value is imposed on the wire, due to the low fracture point of the wire.

If such grids are to be helically wound with the wire supported on a rectangular frame and the laterals uniformly spaced apart, for example to the extent of 300 turns per inch, and the winding uniformly tensioned so that normal heat treatment or brazing to a different coefficient of expansion material will not destroy the tension in the winding, it is evident that present practices fall far short of the desired results in the practical problems of machine production for extensive use. The problem of tension in the fine wire may be readily realized by considering the diagram of Fig. 1 which shows a grid frame $a$ mounted on a rotating arbor in a grid winding machine to apply a pulling force to the wire $b$ extending from a supply reel or spool 10. As the arbor rotates in a clockwise direction, as indicated, the pulling force is a minimum when the frame and arbor are in the full line position and a maximum when the arbor is in a position as shown in dotted line or in a position 90 degrees with respect to the full line position. Any hand or mechanical friction force imposed on the wire $b$ cannot be equalized to the rotation of the arbor even at such low speeds as 50 revolutions per minute for the machine.

The variable factors involved in the application of restraining force on the wire to insure constant tension may be realized from the variable pulling forces acting on the wire as it is wound. In order to equalize the tension in the wire the force would have to be a minimum when the pulling force is maximum (and speed minimum) and maximum when the other is minimum. The usual mechanical methods of securing tension in the wire cannot be so delicately controlled with the result that the wound wire is loose on the winding form or readily exhibits lack of tension when the formed helix is heat-treated. While this extreme example emphasizes the problem, the factors hold true for circular windings of the wire though to a less extent.

The variable retarding forces imposed on the wire during movement may be equalized with respect to the pulling forces by electrical methods, in accordance with this invention, as shown diagrammatically in Fig. 2, to apply constant and uniform tension to the wire and to regulate the braking forces just below the fracture point of the wire so that a predetermined tension is secured. The mechanical forces required to counteract the pulling forces acting on the wire during the winding operation may be attained by converting the mechanical braking forces into electromotive forces acting on a unipolar split-phase fractional induction motor having a cup rotor of low inertia and the field having a high torque characteristic. This may be accomplished by mounting a supply reel or spool 11 of diameter $d$ on the shaft of a fractional motor 12 in which the shaft is rotated in a contradirection with respect to the pulling force $a$ and regulating the voltage supplied to the motor field, as shown in Fig. 3, to apply retarding force on the wire $b$ while it is being wound. The retarding device 12 is a drag cup type motor obtainable from Kollsman Instrument Company of New York and known as the No. 776-02 induction motor, having two phase stator windings 13 and 14, as shown in Fig. 3, which are energized in phase quadrature relation by ordinary 110-volt alternating current supply 25 with a small condenser 15 connected in series with the windings. A variable autotransformer 16 connected across the supply and with output to the phase No. 1 and phase No. 2 windings regulates the speed of the motor. The high torque characteristic 22 of this type of low inertia motor is shown in Fig. 4. The torque of the motor may be measured as a function of the alternating current voltage, as shown in Fig. 2, by a cantilever spring indicator 17. If the angle $\theta=30°$ then $W=T$, the tension in the wire. The weight 21 suspended from the spring on a hook connected to a wire 18 joined to a glass eyelet 19 embracing the wire $b$ as it is wound is equivalent to the tension force imposed on the wire. Any difference in tension, therefore, is evidenced by movement of the spring from zero balance on the scale 20. The static and dynamic characteristics of the tension forces due to the torque of the motor in relation to the voltage supply agree with the square law relation predicted from theoretical calculations and calibrating curves for different diameter reels such as 23 for a .32″ radius reel and 24 for a ½″ radius reel, can be plotted, as shown in Fig. 5, to regulate the tension on the wire in which the tension stress is substantially a straight line over the complete range of controlling power source. The tension forces exhibited by these curves may be transferred to the indicator dial of an auto-transformer 16, to calibrate the voltage supply in definite tension stress in grams weight, to indicate the tension force applied to the wire being wound.

The inertial forces at winding speeds up to 100 revolutions per minute are less than 1 gram and hence negligible. However, at low tension the winding speed should be reduced since the inertial forces increase as the square of the winding speed or a smaller or lighter reel having a low moment of inertia may be used. A control circuit for providing a safety shut-off on full power is, therefore, necessary, to avoid damage to fine wire, of the order of .0005 inch, such as is employed in winding miniature grid structures for ultra-high frequency electronic tubes, which would be greatly distorted, or more probably the end of the wire would be lost, due to overrunning of the motor when the wire is accidentally severed during the winding operation.

One electronic control circuit illustrative of this invention, is shown in Fig. 6, in combination with the wire tensioning control device and the grid winding mechanism. The tension control circuit is generally similar to the basic motor control circuit, described in connection with Fig. 3, but includes a positive acting switching device in the motor circuit and a grid controlled rectifier for energizing the switching device. A feature of the electronic control circuit is the inclusion of the wire being wound as an element of the rectifier circuit so that energizing current flows through the rectifier while the wire is intact and when accidentally broken the switching device is deenergized to apply a braking potential to the motor winding to stop or stall the low inertia rotor instantly so that overrunning of the wire supply reel is prevented.

The 110-volt alternating current supply source 25 having one side grounded at 26 has a starting switch 27 in the line which is bridged by a power type variable autotransformer 28 having a slider 29 connected to open contacts 30 and 31 of a switching relay 32. One side of the winding of the relay 32 is connected to the line and the other side connected to the plate circuit of a pair of power type grid controlled high vacuum rectifier tubes 33 and 34 over conductor 35. A large capacity blocking condenser 36 is connected across the winding of the relay, to control the path of the direct current flowing through the relay or filter the rectified direct current. In addition the filament circuit of the rectifier tubes is supplied from the line by a stepdown transformer 37 and a signal lamp 38 is provided to indicate when the set is in operation. The windings 39 and 40 of the fractional induction motor 41 are connected across the common grounded line 42 and the armatures 43 and 44, respectively, of the relay 32. The voltage is supplied to the windings in essentially phase quadrature relation through a small capacity condenser 45 in series with the No. 2 phase winding. The grids 46 of the rectifiers are connected to a manual control switch 47 through a conductor 48 which is joined to the rear bearing 49 of the motor shaft to provide a conductive connection to the wire reel or spool 50 mounted on the shaft so that the wire completes the grid circuit of the tubes, to control the current flow in the rectifier circuit.

The wire 51 from the reel 50 extends to a grid frame 52 mounted on an arbor or mandrel extending between the rotatable shaft 53 of a grid winding machine which rotates in a clockwise direction at the rate of about one hundred revolutions per minute for the helical winding of the grid structure. The machine is grounded by contact 54 connected to the common line circuit over conductor 55. The shaft of the motor on which the reel is rigidly mounted rotates in a counter-clockwise direction with respect to the grid winding machine, to impose a drag or retarding force or stress on the wire as it is wound on the grid structure so that the torque of the motor applies tension to the wire in relation to the pulling stress or force exerted on the wire by the winding machine, the torque of the motor being governed by the voltage supplied by the impedance 28 connected across the line and motor.

The numerals 64 and 65 indicate the back armature and contact respectively for an alarm or indicator circuit which includes the signal lamp 66. The operation of this circuit is described below.

The operation of the wire tension and motor control circuit is as follows:

The voltage source 25 is initially connected to the relay and rectifier by the closing of switch 27 to supply 110 volts alternating current to the relay over conductors 56 and 57, winding of relay 32, resistance 59, conductor 35 to the plates 60 of the tubes 33 and 34. The tubes conduct current over the discharge paths to the filament circuits 61 connected to the grounded side of the supply line 42. The relay requires approximately sixty milliamperes rectified current to be energized and when the grids 46 of the rectifier are suitably biased through the impedance of the wire 51 in the input circuit, the rectifier supplies about eighty milliamperes current. When the bias on the grid is removed, the current available in the output circuit of the rectifier is reduced to twenty milliamperes so that the relay 32 is deenergized.

Assuming that sufficient current is flowing in the rectifier circuit due to the bias on the grid or the intact wire 51, the relay 32 will be energized to pull up both armatures 43 and 44 thereby connecting the slider 29 to the closed contacts 30 and 31 over conductor 62. The operation of relay 32 therefore applies the line voltage to phase No. 1 of the motor winding 39 over autotransformer 28, slider 29, conductor 62, contact 31, armature 43, winding 39 and back to ground through conductor 42. The supply voltage is also transmitted to phase No. 2 winding of the motor over contact 30, armature 44, condenser 45, winding 40 to ground through conductor 42, since phase No. 2 winding is connected to the common terminal of the phase No. 1 winding of motor 41.

The torque of the windings exerted on the low inertia rotor shaft and consequently on the wire reel 50 attached to the shaft will be dependent on the amount of voltage applied to the windings by the setting of slider 29 on the autotransformer 28 and since this is calibrated in grams weight the braking force imposed on the wire 51 is constant and equalized with respect to the pulling force exerted on the wire by the grid winding machine. Although the motor is revolving in a counter-clockwise direction due to the torque of the stator windings, the pulling force of the grid winding machine causes the reel 50 to revolve in the same direction as the arbor 52 to helically wind the wire in progressive spaced turns on the grid frame structure. The tension on the wire is exerted by the drag or electromotive force due to the torque and speed of the motor 41.

Since the motor is a high speed induction device and normally would rotate in a counter-clockwise direction it is apparent that if the wire 51 is severed, due to any cause, the wire on the supply reel 50 would be considerably distorted and the end lost, particularly if the wire is of very small diameter, such as .0005 inch, if the motor shaft were permitted to overrun when a break occurs in the winding operation.

This difficulty is overcome, in accordance with this invention, by instantly applying braking potential to the rotor shaft to stall the rotor when the wire is severed for any reason during the winding operation. Furthermore, this control action occurs automatically so that no direct manual supervision is necessary to prevent overrunning of the motor when the wire breaks.

Since power for the motor is supplied through the relay contacts and the relay is held in operative condition by sufficient current flowing in the rectifier circuit, due to the controlling action of the grids through the wire 51 connected to the grids and input circuits of the rectifier, the power is disconnected if the relay is deenergized when a current less than sixty milliamperes is supplied by the rectifier circuit. This occurs when the wire breaks thereby interrupting the biasing potential on the grids to reduce or block current flow through the rectifier discharge path. When the relay 32 is deenergized, the armatures 43 and 44 are released to open the circuit of phase 2 winding 40 and transfer the full line voltage to phase 1 winding 39 from the back contact 31 and armature 43 to contact 63, to apply the maximum braking potential through the phase 1 winding to ground, which stalls the rotor of the motor instantly. By stopping the rotation of the motor shaft as soon as the wire breaks, the reel 50 mounted on the shaft is prevented from overrunning so that the fine wire is not distorted and the end lost by uncontrolled revolution of the high speed motor 41. The retarding force is therefore automatically controlled when the wire 51 is severed between the supply wheel 50 and the grid winding machine to protect the delicate wire still on the reel. In addition an alarm or indicator circuit is set up to apprise the operator that the wire 51 is broken, between the motor and the machine by the back armature 64 and contact 65 which closes a circuit to a signal lamp 66 over conductors 56 and 42 through winding 40 of the motor to the supply source 25.

The tension force exerted on the fine wire being wound is constant and equalized with the pulling force acting on the wire as it is applied to a take-up device, such as a grid winding machine, and the electromotive device 41 which imposes the braking force on the wire may be controlled with fine precision to apply the required tension on very fine wire without overstraining the wire to the breaking point. Of course, the same type motor should not be used with all diameters of wire since a smaller motor would be more satisfactory, for example, with smaller than .0005 inch wire, while a larger motor would be desirable for large diameter wire.

While the invention has been disclosed with respect to a specific application of winding small grids for electronic devices, it is obvious that the invention is applicable to other types of winding operations where uniform tension is desired. Furthermore, the specific electronic control of the motor is not mandatory since various circuital arrangements may be devised to accomplish the functional operation and control of the electromotive tension force, in accordance with this invention, without departing from the scope of the invention as defined in the appended claims.

What is claimed is:

1. A wire tensioning device comprising a supply reel of wire, a rotatable mechanism operating in one direction for applying a pulling force on said wire, means for attaching one end of said wire to said mechanism for winding said wire on a take-up element, an electromotive element affixed to said reel and rotatable in the opposite direction to apply a retarding force to said wire during the winding operation, means for controlling the voltage supplied to said electromotive element for tensioning said wire, and means for effecting substantially instantaneous braking of said electromotive element when the wire is broken, said last-mentioned means employing said wire as a current carrying conductor and operating on interruption of the current through said conductor.

2. A wire tensioning device comprising a supply reel of wire, a rotatable mechanism operating in a clockwise direction for applying a pulling force on said wire, means for attaching one end of said wire to said mechanism for winding said wire on a take-up element, an electromotive element rotatable in a counter-clockwise direction to apply a retarding force to said wire during the winding operation, means to control the voltage supplied to said electromotive element for applying uniform tension on said wire, a control circuit including an electronic grid controlled rectifier, said wire being connected thereto to render said rectifier conducting, and switching means controlled by said rectifier when the wire breaks to stop substantially instantly said electromotive element.

3. A control device for wire winding operations including a polyphase induction motor having a low inertia rotor, a terminal connection to said rotor, a grid controlled rectifier, a wire supply spool coupled to said rotor, means for coupling said wire to said rectifier through said terminal connection, a switching relay controlled by said rectifier, and contacts on said relay for connecting a voltage source to a single phase winding of said motor to brake the movement of said rotor when the wire is broken.

4. A wire tensioning and control device comprising a rotatable mechanism operating in a clockwise direction for applying a pulling force on the wire, a polyphase induction motor having a low inertia rotor shaft, means for regulating the voltage supplied to the windings of said motor in polyphase relation to control the torque of said shaft, said rotor shaft being rotatable in a counterclockwise direction, a grid controlled rectifier, a wire supply spool coupled to said shaft, means for coupling the wire to the grid circuit of said rectifier, a switching device controlled by said rectifier, and means to supply a voltage to one winding of said motor when the wire breaks to apply a braking field to said shaft.

5. An electronic control circuit for winding operations involving fine wire subject to damage by breakage, comprising a fractional drag cup motor, a variable autotransformer for regulating the drag on said motor to apply a suitable retarding force on said wire, a spool of fine wire on the shaft of said motor, a pair of electronic tubes having a grid circuit connected to said wire, a relay in the plate circuit of said tubes, and connections between said relay and motor to stop substantially instantly said motor when the wire breaks.

6. A motor control circuit for a grid winding machine, comprising a motor, a wire supply spool connected to the shaft of said motor to apply retarding force to said wire while being wound by the machine, a variable autotransformer connected across a supply voltage feeding said motor to regulate the tension on said wire, a grid controlled rectifier normally biased through said wire in series with the grid to permit current flow through the output circuit of the rectifier, and a switching device connected to the output of said rectifier to stop substantially instantly said motor when said wire breaks.

7. A motor control circuit for a grid winding machine comprising a motor, a wire supply spool connected to the shaft of said motor to apply retarding force to said wire while being wound by said machine, a variable autotransformer connected across a supply voltage feeding said motor to regulate the tension on said wire, a grid controlled rectifier normally biased through said wire in series with the grid of the rectifier to be conductive, and a relay controlled by said rectifier to apply braking potential to said motor when said wire is severed.

8. A grid winding device comprising a winding machine to apply a pulling force to the wire on a supply reel in a clockwise direction, a fractional induction motor having a rotor shaft turning in a counter-clockwise direction, said reel being coupled to said shaft to apply a prescribed tension to said wire while being wound, an autotransformer connected across a voltage source to control the torque of said motor during the winding operation, an electronic control circuit, said wire forming a coupling connection between said machine and said circuit, and means actuated by said control circuit when the wire breaks to stop said rotor shaft by braking said shaft.

9. A helical grid winding device comprising a winding machine to apply a pulling force to the wire on a supply reel in a clockwise direction, a fractional induction motor having a rotor shaft turning in a counter-clockwise direction, said reel being rigidly affixed to said shaft to apply a uniform tension to said wire while being wound, a variable autotransformer connected across a voltage source to control the torque of said motor, an electronic control circuit including a grid controlled rectifier, a circuit including a coupling connection between said shaft and the grid of said rectifier for applying a bias to said grid, and switching means operative by said control circuit to apply braking potential to said rotor shaft when the wire is parted between said machine and reel.

10. The method of preventing distortion of fine wire during winding when the wire is accidentally broken which comprises, winding the wire on a take-up element rotatable in one direction, supplying said wire from a reel attached to a fractional electromotive device rotatable in the opposite direction, controlling the torque of said device to maintain a definite tension stress in said wire, passing current through said wire, and stopping said device instantly when the wire breaks and interrupts said current by applying a braking potential thereto controlled by said current.

11. The method of controlling the winding of fine wire in helical formation under uniform stress below the breaking point of said wire which comprises applying a pulling force to said wire for winding in helical form in a clockwise direction, applying a pulling force to said wire in the opposite direction to retard said wire, regulating the retarding force on said wire during winding for tensioning the helical turns of the wire, passing current through said wire while said wire is being wound, and passing said current to switching means to operate braking means when said wire breaks.

12. A wire winding device to apply tensional force to the wire when helically wound on a frame type grid electrode comprising, means for pulling the wire in one direction of rotation as it is helically wound on the grid frame, a fractional induction motor of high torque to rotor inertia ratio having a shaft for supporting a wire supply reel and rotatable in reverse direction with respect to said pulling means, a voltage supply source for said motor, a variable autotransformer connected across said source and motor for controlling the speed thereof, a terminal connection to said shaft, a rectifier circuit including a pair of grid controlled vacuum tubes, a relay connected to the output of said tubes, said wire being coupled through said shaft between said pulling means and the grids of said tubes, and contacts associated with said relay for applying a braking potential to said motor to instantly stall said motor when the wire breaks and for energizing indicating means when the severance occurs.

13. A wire winding tensioning device to equalize retarding forces imposed on the wire when helically wound on a frame type grid electrode comprising, a grid winding machine rotatable in one direction as the wire is helically wound on the grid frame, a supply reel for said wire, a two-phase winding motor driving a low inertia cup rotor on a shaft rotatable in the opposite direction, said reel being attached to said shaft with the wire stretched between said reel and grid frame, a conductor in contact with the shaft of said motor for coupling said wire in circuit, a line voltage source for said motor, a variable autotransformer bridged across said source and motor, a phase shifting capacitance between said autotransformer and one motor winding to energize said motor in polyphase relation for applying a uniform retarding tension force on said wire while being wound on said grid frame, a control circuit for said motor including a grid controlled rectifier device and a switching relay, means for coupling said wire to the grid of said rectifier through said conductor connected to said shaft for inducing current flow in said rectifier when the wire is intact, said relay being connected in the output circuit of said rectifier and operative when conduction occurs in said rectifier, and means actuated when said relay is deenergized to connect said line voltage to a single phase winding of said motor to apply a braking potential to said rotor and shaft when the wire is accidentally severed, to prevent distortion of the wire by overrunning of the motor shaft.

JACK A. MORTON.

REFERENCES CITED

The following references are of record in the file of this patent:

UNITED STATES PATENTS

| Number | Name | Date |
|---|---|---|
| 1,832,430 | Siebs | Nov. 17, 1931 |
| 2,126,470 | Johnson | Aug. 9, 1938 |
| 2,193,121 | Codling | Mar. 12, 1940 |
| 2,469,706 | Winther | May 10, 1949 |